United States Patent [19]

Welsch et al.

[11] Patent Number: 5,048,043
[45] Date of Patent: Sep. 10, 1991

[54] GAS LASER

[75] Inventors: Wolfgang Welsch, Baldham; Hans Krueger, Munich; Klemens Huebner, Ottobrunn; Rudolf Haeusler, Munich, all of Fed. Rep. of Germany

[73] Assignee: Siemens Aktiengesellschaft, Munich

[21] Appl. No.: 564,739

[22] Filed: Aug. 6, 1990

[30] Foreign Application Priority Data

Sep. 27, 1989 [DE] Fed. Rep. of Germany ....... 3932256

[51] Int. Cl.$^5$ .............................................. H01S 3/03
[52] U.S. Cl. .................................. 372/65; 372/61
[58] Field of Search ................................... 372/61, 65

[56] References Cited

U.S. PATENT DOCUMENTS

| 3,739,297 | 6/1973 | Mark | 372/61 |
| 3,766,487 | 12/1973 | Roox | 372/61 |
| 3,784,927 | 1/1974 | Rudolph | 372/65 |
| 3,988,698 | 10/1976 | Crane et al. | 372/65 |
| 4,203,080 | 5/1980 | Wright et al. | 372/65 |
| 4,311,969 | 1/1982 | Kolb | 331/94.5 |
| 4,644,554 | 2/1987 | Sheng | 372/65 |
| 4,799,232 | 1/1989 | Welsch | 372/61 |
| 4,823,356 | 4/1989 | Riley | 372/65 |

Primary Examiner—Léon Scott, Jr.
Attorney, Agent, or Firm—Hill, Van Santen, Steadman & Simpson

[57] ABSTRACT

In a gas laser having a capillary and a cathode that envelopes the capillary, a fastening of the cathode suitable for batch soldering is achieved in that the cathode is secured to an end piece having a mount for an optical element, and an end of the cathode facing away from the end piece is elastically supported against a housing wall with such a slight spring power that a weight of the unit formed of the cathode, end piece, and mount is adequate for overcoming the friction between the spring and the housing wall. Thus, the end piece with the attached cathode can slide into its final position during soldering solely on the basis of the force of gravity. The invention is particularly suited for helium-neon lasers that are manufactured in glass solder technology.

10 Claims, 1 Drawing Sheet

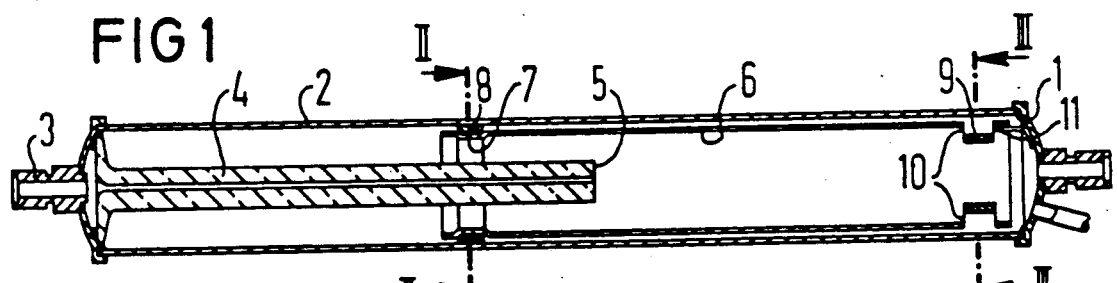
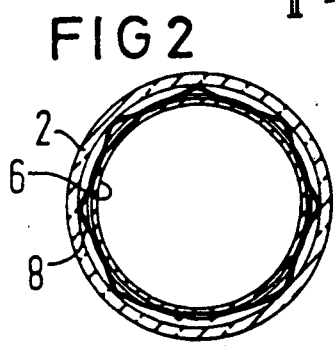 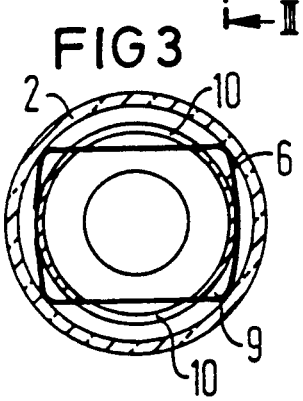
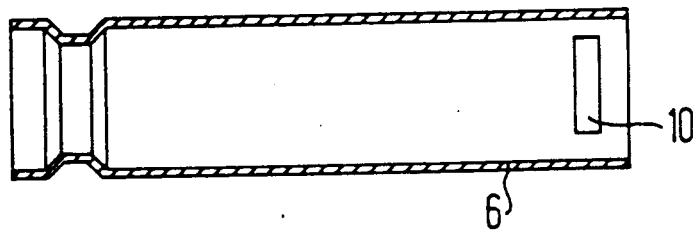
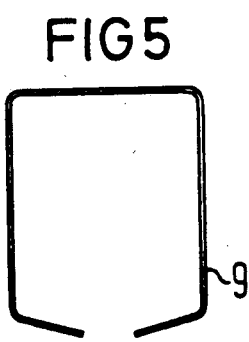 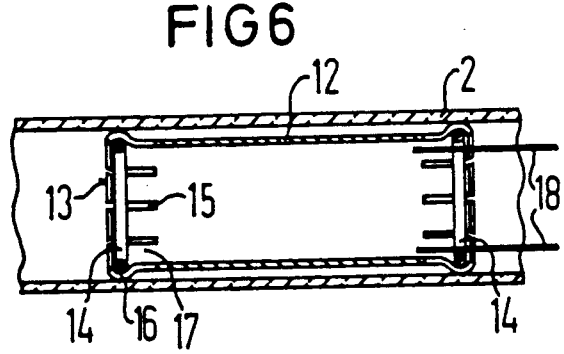

GAS LASER

BACKGROUND OF THE INVENTION

The present invention is directed to a gas laser wherein a housing tube is provided having end pieces at ends thereof with mounts for optical elements. A capillary is provided which projects into the housing tube. A cylindrical cathode surrounds an end of the capillary. Such a gas laser is disclosed by U.S. Pat. No. 4,311,969, incorporated herein by reference. There, a termination that is carried at and fixed to a face plate of metal is applied to a cathode. For example, a nose that proceeds through a beam passage opening is applied to the electrode and this nose is plugged into the end plate and is riveted thereto in the fashion of a tube rivet. In this known embodiment, there is the risk that the heating required in the vacuum-tight closing of the housing leads to the deformation of the nose since the cathodes of lasers are usually formed of aluminum or of aluminum alloys, and the cathode nose is loosened as a result thereof. Thus, the electrical contact that is to be guaranteed via the same connection is interrupted at times, that is it can become an intermittent contact. This cathode fastening is fundamentally unsuited for manufacture in glass solder technology wherein an entire batch of tubes is simultaneously soldered in a furnace. The cathode already becomes soft at the temperature needed for the glass soldering; the fastening becomes unstable during the soldering (difference in expansion); the contacting is no longer faultlessly guaranteed; and the position in the housing tube is no longer faultlessly defined, so that a mechanical chattering during later operation must be feared. In an additional fastening of the electrode conforming to the above mentioned U.S. patent, a spring is provided at the open end of the cathode, this spring having spring arms pressing against the enveloping tube and against the capillary. A relatively high spring power must be exerted so that the spring is held in its axial position solely on the basis of the spring power. Furthermore, the spring power must suffice for centering the capillary that is generally formed of glass or of ceramic; and it must intercept mechanical vibrations of the capillary. For these reasons, the electrode must be shifted into its ultimate position before the housing is closed. This causes individual handling of the tubes; and a batch soldering is fundamentally impossible without further work in such a design.

SUMMARY OF THE INVENTION

An object on which the present invention is based, among others, is to provide a laser structure that is suitable for batch soldering in glass solder technology.

According to the invention, spring means is provided for supporting and centering an end of the cathode opposite the second end piece relative to a wall of the housing. A spring power of the spring means is such that when the second end piece is drawn in a glass soldering process at the end of the housing tube, an intrinsic weight of the end piece with the attached cathode is sufficient to overcome a friction between the spring means and the housing wall so as to allow the end piece to be displaced axially relative to the housing tube axis during the glass soldering process.

In the cathode of the invention, the spring is prevented from being displaced in an axial direction relative to the cathode due to the shaping of the cathode. This spring, however, is provided with such low spring power that, first it centers the cathode, but secondly, in view of a low friction relative to the housing wall, it is displaced or slides together with the cathode in an axial direction along the housing wall when the axis of the housing is arranged substantially vertically during glass soldering of the housing due to the weight of the cathode together with the end piece and the mirror mount. This enables batch soldering. When heating the tube to the soldering temperature and when a solder ring introduced in a standard way between the parts to be soldered softens, the end piece with the attached cathode thus sinks into its final position. Thus, an operation performed thereon from the outside is no longer required.

Insofar as a glass solder connection is to be produced only at the cathode side, the end piece can lie at the bottom in the soldering position so that the entire weight of the tube parts lying thereabove can be utilized for overcoming the friction. The prerequisite therefor is only that the pressure loadability of the electrode in the axial direction is also adequate for overcoming the friction at the soldering temperature.

An advantageous embodiment of the invention is that the cathode has slots in the proximity of its end facing away from the end piece. These slots are provided at at least two regions that lie opposite one another with reference to their rotational axis. A spring clip that presses against the housing wall is snapped into these slots. The spring clip is advantageously approximately rectangularly bent, and presses resiliently against the cathode and against the cathode tube between the two slots.

A further advantageous embodiment is that the cathode has a region deformed in a radial direction toward the symmetry axis in the proximity of its end face facing away from the end pieces. An undular or wave-shaped washer is introduced in this region. This embodiment is particularly suitable for relatively large cathode diameters since relatively great distances between the cathode and the housing tube can be bridged as a result thereof without difficulties. The deformed region is preferably designed as a bead or as an impressed groove. However, it can also have other shapes and, for example, can be interrupted in a circumferential direction so that a plurality of deformed regions arise. In this case, too, an undular washer can be placed therein which can, for example, press against the housing wall between the deformed regions.

The electrode is advantageously formed of aluminum or of an aluminum alloy, and comprises slots departing from the end face facing away from the end piece. These slots define a resilient end region. At least one deformation of the cathode that proceeds outwardly in a radial direction lies in this end region. An outwardly pressing spring is inserted into the deformation of the end region. This spring does not effect any deformation of the electrode in the cold condition but, at soldering temperature, presses at least some of the tongues of the cathode formed by the slots against the vessel wall. This embodiment guarantees the required low friction while the laser is being soldered together. The spring thus lies outside of the region of the plasma discharge, so that no sputtering need be feared. The deformation is advantageously a bead proceeding in a circumferential direction, whereby the spring can be an annular undular washer.

In a preferred embodiment, the end piece is a metal cap. The metal cap has a guide edge that embraces the envelope of the housing tube and covers it by more than the enlargement of the expanse of the housing in the axial direction effected by the attachment of the solder ring before the soldering. A further advantageous embodiment has the features that the end piece is introduced into the housing tube, and comprises a part pressing against the end face of the housing tube. This end piece holds the solder ring before the soldering process and projects farther into the housing tube than an offset in the axial direction that is produced by the solder ring during the soldering process.

The invention enables the use of glass tubes as a housing tube that is not subject to any particular tolerance demands in view of its diameter. The spring design enables a faultless centering of the cathode, even given relatively large diameter tolerances.

BRIEF DESCRIPTION OF THE DRAWINGS

The invention shall now be set forth with reference to six figures. It is not limited to the examples shown in the figures.

FIG. 1 shows a gas laser of the invention in a sectional view;

FIGS. 2 and 3 show sections through such a gas laser having different resilient supports for the cathode;

FIG. 4 shows a cathode according to the example of FIG. 3 in a sectional view;

FIG. 5 shows a spring for use in the gas laser assembly; and

FIG. 6 shows an example of a further cathode supported at both sides.

DESCRIPTION OF THE PREFERRED EMBODIMENTS

End pieces 1 designed as metal caps are soldered to a housing tube 2 to form a laser housing. Mounts 3 for optical elements, particularly for mirrors, are attached to the end pieces 1. A capillary 4 extends from an end of the laser at the anode side into the housing tube 2. The end 5 of the capillary 4 facing away from the anode is surrounded by the cathode 6. In an axial direction toward the end 5 of the capillary 4, the cathode 6 has a region 7 deformed in a radial direction toward a symmetry axis. An undular or wave-shaped washer 8 that supports and centers the cathode 6 relative to the housing tube 2 lies in this region 7.

In the proximity of the metal cap at the cathode side the cathode 6 comprises two slots 10 that cover only a part of the circumference thereof and lie opposite one another with reference to the rotational axis of the cathode. A metal spring 9 is snapped into the slots 10, this metal spring 9 pressing resiliently against the cathode 6 and against the housing tube 2 between the two slots 10, thus fixing the cathode 6 in a radial direction relative to the housing tube 2. A contact band 11 produces an electrical contact between the metal cap and the cathode 6 and simultaneously supports the cathode in an axial direction.

Some differently shaped end pieces, for example an end piece of sintered glass that is inserted into the housing tube 2 with a guide cylinder, can be employed instead of the metal cap 1. Such end pieces are disclosed by U.S. Pat. No. 4,799,232, incorporated herein by reference.

The examples have shown cathode shapes supported against the housing wall at both sides. Given an adequate fixing of the radial position in the region of the metal cap of the cathode side by, for example, the power lead, the support against the housing wall lying closest to this metal cap can be omitted.

A further advantageous and uninvolved cathode shape is shown in FIG. 6. A cathode 12 that already has a reduced shape stability at the soldering temperature and that is preferably formed of aluminum or of aluminum alloys is outwardly expanded at least in the region of its end face 13 facing toward the anode. In the illustrated example, however, it is outwardly expanded in the radial direction at both sides. A spring ring 14 is introduced into this widened portion and is fixed in the axial direction relative to the cathode. In the illustrated example, the fixing occurs on the basis of an appropriate shaping of the cathode. Slots 15 extend from the end face to beyond the spring ring 4 and into the cathode 12. They form clips 17 that embrace the widened portions 16. In the cold condition, the spring power of the spring ring 14 is not adequate to bend the clips 17 to a noteworthy degree. During soldering, however, when the spring power of the cathode material decreases, the spring ring 14 presses the clips 17 outward and thus manages the required, resilient pressing of the cathode 12 against the housing wall. Even in the hot condition, the deformations 16 are adequate for the axial fixing of the spring ring 14. The spring power of the spring ring 14 is dimensioned such that, even given the insertion of two spring rings as shown in the present example, the weight of the end piece and of the tube parts connected thereto can push the cathode 12 into the housing tube. For example, the cathode is joined to the end piece via two or more connecting clips 18. The end piece is not shown.

Although various minor changes and modifications might be proposed by those skilled in the art, it will be understood that we wish to include within the claims of the patent warranted hereon all such changes and modifications as reasonably come within our contribution to the art.

We claim as our invention:

1. A gas laser tube structure, comprising:

a housing tube having respective first and second end pieces at opposite ends thereof, each of the end pieces having mounting means for an optical element;

the first end piece having positioned thereat a capillary as a discharge channel which projects into the housing tube;

a cylindrical cathode in the housing tube which surrounds an end of the capillary, said cathode having an end face termination and a beam passage opening at said second end piece, and said cathode being connected to said second end piece; and spring means for axially displaceably supporting and centering and end of the cathode opposite end face termination relative to a wall of the housing tube such that when the second end piece is joined in a glass soldering process at the end of the housing tube with the housing tube aligned in its soldering position, an intrinsic weight of the end piece with the attached cathode is sufficient to overcome a friction between the spring means and the housing wall thereby allowing the end piece to be displaced axially relative to the housing tube axis during the glass soldering process and permitting the cathode to shift to its final position after the housing is closed by the end piece.

2. A gas laser tube structure according to claim 1 wherein the cathode has at least two slots lying opposite one another with reference to a rotational axis of the cathode, said slots being positioned in a region near an end of the cathode adjacent the second end piece; and spring clip means in the slots and pressing against the housing wall.

3. A gas laser tube structure according to claim 2 wherein the spring clip means is approximately rectangularly bent and is received in snap-like fashion in the two slots; and the spring clip means pressing radially against the cathode between these two slots.

4. A gas laser tube structure according to claim 1 wherein near and end of the cathode nearest the first end piece a deformed region is provided in a radial direction toward a symmetry axis of the cathode; and said spring means comprises an undular spring washer received in the deformed region and which presses against the housing wall.

5. A gas laser tube structure according to claim 1 wherein the cathode has slots at at least two regions lying opposite one another with reference to a rotational axis of the cathode in a proximity of an end of the cathode nearest the first end piece; and a spring clip received in the slots and pressing against both an outer circumference of the cathode and the housing wall.

6. A gas laser tube structure according to claim 1 wherein at an end face of the cathode nearest the first end piece slot means are provided for making at least some portions of an outer circumference of the cathode at the end face flexible, and wherein said spring means comprises a spring positioned to deflect the flexible portions outwardly so as to press them against the housing wall.

7. A gas laser tube structure according to claim 1 wherein the cathode comprises aluminum; slots are provided at an end face nearest the first end piece so as to define a resilient end region at the end face; at least one deformation being provided at the end face which proceeds outwardly in a radial direction; an outwardly pressing spring introduced into the deformation at the end face end region; and the spring having a spring power chosen such that said spring power does not effect a deformation of the cathode in a cold condition but at soldering temperature, presses portions of the resilient end region against the housing wall.

8. A gas laser tube structure according to claim 1 wherein the second end piece comprises a metal cap; and the metal cap having a guide edge means for embracing an edge of the housing tube and covering said edge of said housing tube by more than an increase in an axial direction caused by provision of a soldering ring thereon before soldering.

9. A gas laser tube structure according to claim 1 wherein said second end piece lies against an end face of the housing tube and holds a solder ring before the glass soldering; and the second end piece projecting farther into the housing tube than an offset along an axial direction of the housing tube that is produced by melting of the solder ring during soldering.

10. A gas laser tube structure, comprising:
a housing tube having respective first and second end pieces at opposite ends thereof;
adjacent the first end piece a capillary as a discharge channel positioned in the housing tube;
a cathode in the housing tube having one end connected to said second end piece; and
spring means for axially displaceably supporting an end of the cathode opposite said one end relative to a wall of the housing tube such that when the second end piece is joined in a soldering process at the end of the housing tube, an intrinsic weight of the end piece with the attached cathode is sufficient to overcome a friction between the spring means and the housing wall thereby allowing the end piece to be displaced axially relative to the housing tube axis during the soldering process and permitting the cathode to shift to its final position after the housing is closed by the end piece.

* * * * *